J. SHANKS.
HEAD GATE.
APPLICATION FILED MAY 29, 1917.

1,264,690.

Patented Apr. 30, 1918.

Inventor
J. Shanks.

UNITED STATES PATENT OFFICE.

JOSEPH SHANKS, OF RIGBY, IDAHO.

HEAD-GATE.

1,264,690.

Specification of Letters Patent.

Patented Apr. 30, 1918.

Application filed May 29, 1917. Serial No. 171,801.

*To all whom it may concern:*

Be it known that I, JOSEPH SHANKS, a citizen of the United States, residing at Rigby, in the county of Jefferson and State of Idaho, have invented certain new and useful Improvements in Head-Gates; and I do hereby declare the following to be a full, clear, and exact description of the invention, such as will enable others skilled in the art to which it appertains to make and use the same.

This invention relates to improvements in headgates for irrigating systems, and an object of the invention is the provision of a simple, durable and efficient headgate that can be conveniently operated and held in a novel manner in selected positions so as to admit of the flow of water through the gate being regulated.

Other objects will appear and be better understood from that embodiment of my invention of which the following is a specification, reference being had to the accompanying drawing forming a part thereof, in which.

Figure 1:
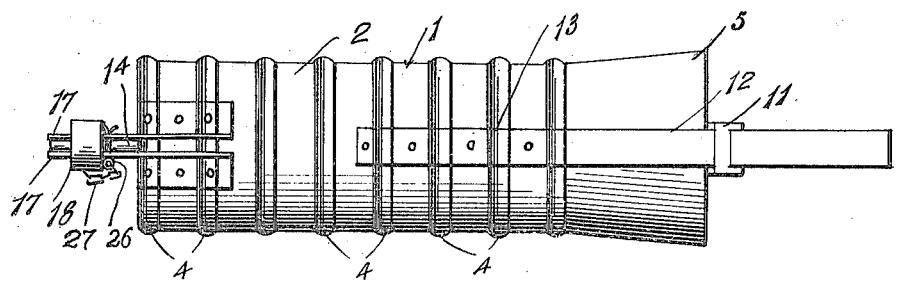
Figure 1 is a top plan view of the gate.
Figure 2:
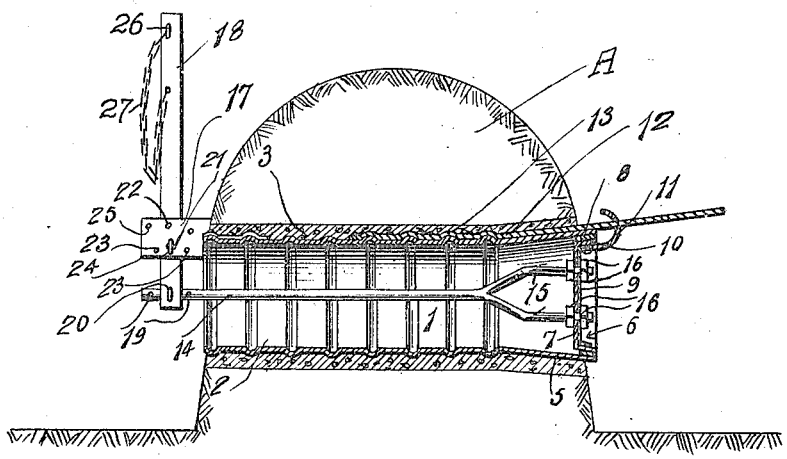
Fig. 2 is a longitudinal sectional view through the gate, and showing the gate in position.
Figure 3:
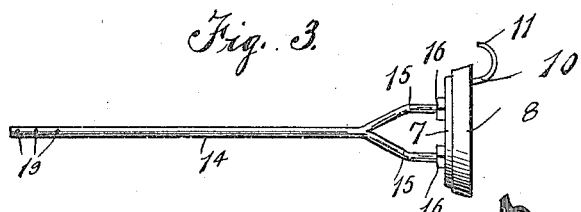
Fig. 3 is a side view of the valve and operating rod therefor.

Referring to the drawing in detail, the letter A designates an irrigating canal and the numeral 1 designates, as an entirety, the headgate which is designed to control the escape of water from the canal.

The headgate comprises a conduit 2 that extends through one of the banks of the canal and is set in plastic material, designated 3, the said conduit having a plurality of peripheral reinforcing ribs 4, which are embedded in the plastic material 3 and serve the double function of reinforcing the conduit and also preventing longitudinal creeping of the conduit. The inner end of the conduit 1 extends a distance into the canal and is flared, as shown at 5, to provide a valve seat for a valve 6. The valve 6 consists of a substantially frusto-conical shaped body 7 and a ring shaped packing 8, which is formed preferably of leather and is secured to the body 7 in any suitable manner. A metallic strip 9 is bent into U form and inserted within the body 7 of the valve 6 and one side of the U-shaped strip is extended outwardly beyond the adjacent end of the body 7, as shown at 10, and thence curved rearwardly, as shown at 11, and provided with an opening that loosely receives a guide rod 12. The guide rod 12 is formed of a flat strip of metal and overlies the inner end of the conduit 2 and has one end thereof inserted between the conduit and the plastic material, the said end of the rod being provided with a plurality of ribs 13, which are pressed upwardly therefrom and coöperate with the ribs 4 on the conduit 2 for assisting in holding the guide rod in operative position. The outer end of the guide rod 12 extends a distance beyond the inner end of the conduit 2 and is adapted to guide the valve 6 during its movement to either open or closed position. An operating rod 14 extends through the conduit 2 and has the inner end thereof bifurcated, as at 15, and the fingers of the bifurcated end extend through the inner side of the body 7 of the valve 6 and through the bight portion of the U-shaped strip 9 and nuts 16 are turned on the ends of the fingers of the bifurcated end of the rod 14 and secure the body 7, U-shaped rod 9 and operating rod 14 in assembled position.

A pair of angular shaped bars 17 are secured to the outer end of the conduits 2 and each has one end extended beyond the outer end of the conduit and a lever 18 is positioned between the bars 17 and is formed of a strip of metal bent into inverted substantially U form and has the lower ends of the sides thereof receiving therebetween the outer end of the rod 14. The lower ends of the sides of the lever have alined openings therein for registering with any one of the openings of a longitudinal series, designated 19, formed in the outer end of the rod 14, for the reception of a pivot pin 20. Each of the sides of the lever 18 also has a pair of openings located one above the other and designated 21 and 22, the said openings 21 and 22 being formed in that portion of the lever that lies between the bars 17. The lowermost openings 21 in the sides of the lever are adapted to be registered with the openings of any opposed pair in opposed series of openings 23 formed in the bars 18, for the reception of a pivot pin 24, so as to connect the lever 18 to the bars 17. When the upper end of the lever 18 is moved outwardly the lower end of the lever will be moved inwardly, resulting in the rod 14 being moved inwardly and unseating the valve 6. The inward movement of the rod 14 can be regulated by adjusting the lever 18 either on the rod 14 or on the lever 17, and in this manner regulating the flow of water through the conduit 2. The upper openings 23 in the sides of the lever 18 are adapted to be registered with the openings 20 of any opposed pair in opposed series of openings 25 formed in the bars 17 and located above the openings 23, and when such registration is effected, a cotter pin 26 is inserted into the registering openings so as to hold the lever against movement in either direction.

From the foregoing it will be seen that the valve 6 can be moved to and held at any desired position so as to regulate the flow of water through the condut 2.

The cotter pin 26 is carried by a flexible element 27 secured to the lever 18, so as to prevent the cotter pin from being misplaced when withdrawn from operative position.

It is evident that various changes might be resorted to in the form, construction and arrangement of the several parts without departing from the spirit and scope of the invention as claimed.

Having thus described my invention what I claim as new, is:

1. A water headgate for irrigating systems including a conduit, a valve located at one end of the conduit, an operating rod having one end connected to the valve, a pair of spaced elements mounted on the other end of the conduit and having opposed series of openings therein, an operating lever operatively connected with the rod and extending between the elements on the conduit and having an opening therein for interchangeably registering with the openings of the opposed series, and an element adapted to be received by the registering openings of the opposed series and in the lever for normally holding the lever against movement.

2. A water headgate for irrigating systems including a conduit, a valve located at one end of the conduit, a guide rod carried by the conduit, an element carried by the valve and having an opening therein for loosely receiving the guide rod, and an operating rod connected to the valve.

3. A water headgate for irrigating systems including a conduit having one end flared to provide a valve seat, a valve co-operating with the seat, a U-shaped element carried by the valve and having the free end of one side thereof curved and provided with an opening, and a guide rod carried by the conduit and received by the opening in the side of the U-shaped element.

In testimony whereof I affix my signature in presence of two witnesses.

JOSEPH SHANKS.

Witnesses:
W. E. ELIESON,
JAY H. BUSH.

Copies of this patent may be obtained for five cents each, by addressing the "Commissioner of Patents, Washington, D. C."